Feb. 11, 1941.  A. F. GREINER  2,231,117

SPLINE JOINT

Original Filed Dec. 15, 1938

INVENTOR.
ANTON F. GREINER
BY Whittemore Hulbert & Belknap
ATTORNEYS

Patented Feb. 11, 1941

2,231,117

UNITED STATES PATENT OFFICE 2,231,117

SPLINE JOINT

Anton F. Greiner, Detroit, Mich.

Original application December 15, 1938, Serial No. 245,961. Divided and this application December 26, 1939, Serial No. 310,999

8 Claims. (Cl. 64—23)

This invention relates generally to improvements in torque transmitting joints and is a division of my copending application Serial No. 245,961, filed Dec. 15, 1938.

It is one of the principal objects of this invention to provide a torque transmitting joint having provision for transmitting motion from one member to another member with the minimum power loss and, in addition, having means permitting limited relative axial movement of the members without affecting the efficiency of the torque transmitting characteristics of the joint.

Another object of the present invention resides in the provision of a torque transmitting joint of the type set forth having means for resisting relative axial movement of the members in either direction in a manner to effectively dampen any shock reactions occasioned by sudden or abrupt relative axial displacement of the members. This shock absorbing characteristic is particularly advantageous in cases where the joint is used in combination with a torque transmitting universal joint to connect the power plant of a road vehicle to the road engaging driving wheels, since it provides for substantially dissipating the shock resulting from abrupt displacement of the wheels relative to the power plant before the shock reactions reach the latter. As a result, the power plant is not only relieved of undue strains, but the riding qualities of the vehicle are improved.

A further advantageous feature of this invention resides in the provision of a joint of the type set forth above having relatively short bending moment arms and having comparatively long torque transmitting leverage arms. Accordingly, the joint is capable of transmitting high torques with the minimum stress on the parts.

In addition to the foregoing, this invention contemplates a torque transmitting spline joint composed of a relatively few simple parts capable of being inexpensively manufactured, assembled and installed.

The foregoing, as well as other objects, will be made more apparent as this description proceeds, especially when considered in connection with the accompanying drawing, wherein.

Figure 1:
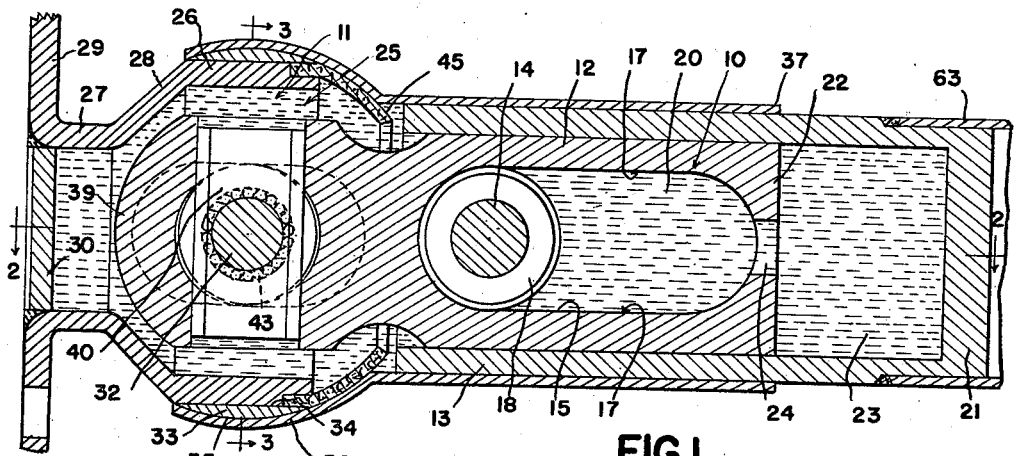
Figure 1 is a longitudinal sectional view of a spline joint constructed in accordance with this invention.

For the purpose of illustration, I have shown my improved spline joint 10 in conjunction with a particular torque transmitting universal joint 11, although it will be apparent as this description proceeds that the spline joint may be used to advantage in any combination where it is desired to transmit motion through a slip joint, regardless of whether the combination embodies a universal joint and notwithstanding the construction of the universal joint.

The spline joint is shown in the several figures of the drawing as comprising a motion or torque transmitting member 12 and a tubular driven member 13 telescopically receiving the member 12. Motion is transmitted between the two members by means of a pin 14 extending transversely of the axes of the members through a slot 15 in the member 12 and having the free end portions anchored in suitable openings 16 formed in opposite sides of the tubular driven member 13. The axis of the pin 14 is perpendicular to the axes of the members and is disposed in a common plane with the latter axes. The slot 15 is elongated in the direction of the axes of the members with the opposite sides thereof forming flat surfaces 17 extending substantially parallel to each other and to the common plane aforesaid.

The opposed surfaces 17 of the slot are engaged by a pair of rollers 18 rotatably mounted on the pin 14 with the adjacent ends in contact with each other and with the opposite ends engageable with the adjacent surfaces of the driven member 13. Inasmuch as the free ends of the pin 14 are anchored in the openings 16 in opposite sides of the tubular driven member 13 and in view of the fact that the peripheral surfaces of the rollers 18 have a bearing engagement with the opposed surfaces 17 of the slot in the member 12, it follows that the bending moment arms are relatively short while the torque transmitting leverage arms are comparatively long. This condition is, of course, desirable in that it permits transmitting high torques with the minimum stress on the parts.

The rollers 18 have a rolling engagement with the opposed flat sides of the slot 15 and, since the latter is elongated in the direction of length of the axes of the members, it follows that the members are free to move relative to each other in the direction of their axes without interfering with the torque transmitting characteristics of the pin 14 and associated rollers 18. This arrangement is particularly advantageous in cases where the joint is employed to connect a driving element forming a part of the sprung assembly of a motor vehicle with a driven element associated with the unsprung assembly of the vehicle in that it permits the desired adjustment of the driving connection to compensate for relative deflection of the assemblies.

In installations of the type briefly set forth above, there is a possibility of the two members 12 and 13 moving so abruptly relative to each other in either direction that a severe shock is imparted to the sprung assembly. In order to overcome any tendency for severe shock reactions to develop, I provide means for cushioning relative movement of the members in a manner to insure both quiet and smoother operation of the joint. Upon reference to Figures 1 and 2, it will be noted that the opposed open sides of the slot 17 are closed by the adjacent portions of the tubular driven member 13 in a manner to form a chamber 20 and the rear end of the tubular driven member 13 is closed by a wall 21 cooperating with the adjacent end wall 22 of the torque transmitting member 12 to form a second chamber 23. The two chambers communicate with one another through the medium of a restricted port 24 formed in the end wall 22 and both chambers are packed with a hydraulic fluid medium, such as a suitable lubricant.

The above construction is such that when the members 12 and 13 are relatively shifted in directions toward each other, fluid is transferred from the chamber 23 through the restricted port 24 to the chamber 20. On the other hand, when the members are relatively moved in the opposite direction, fluid passes from the chamber 20 through the port 24 to the chamber 23. Inasmuch as the port 24 is restricted, it follows that a damping action results and, of course, this action may be controlled by altering the size of the port 24.

The spline joint, previously described, is especially advantageous when used in connection with a torque transmitting universal joint in that it offers the possibility of relieving the universal joint from undue shocks. One way in which the spline joint may be compactly and inexpensively combined with a universal joint is shown in Figures 1 and 2 of the drawing, although, it will, of course, be understood that the particular construction of the universal joint may vary substantially from the one illustrated without detracting from the operation of the spline joint previously described.

With the above in mind, reference will be made to the universal joint 11, shown in the several figures of the drawing for the purpose of illustrating the adaptability of my improved spline joint in a combination embodying a torque transmitting universal joint. In detail, the universal joint 11 is provided with a flanged member 25 having an enlarged cylindrical portion 26 connected at its forward end to the rear end of a reduced cylindrical portion 27 by means of a conical section 28. The forward end of the cylindrical portion 27 terminates in a radially outwardly extending attaching flange 29 having provision for securing the universal joint to either a driving element or a driven element. In the present instance, the attaching flange 29 is adapted to be secured to a suitable driving element (not shown) and, accordingly, the member 25 will be hereinafter referred to as the driving member of the joint. It will also be observed from Figures 1 and 2 of the drawing that the forward end of the cylindrical portion 27 is closed by means of a disc 30 approximating the internal diameter of the cylindrical portion 27 and welded, or otherwise suitably secured to the driving member 12. In actual practice, the universal joint 11 is charged with a suitable lubricant through the opening provided by the cylindrical portion 27 prior to securing the closure or disc 30 in place.

Figure 2:
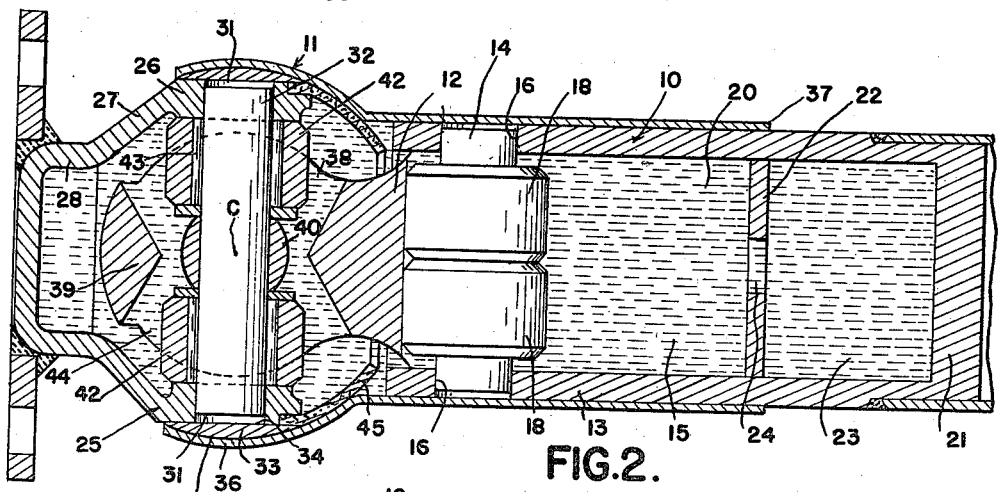
Figure 2 is a sectional view taken substantially on the line 2—2 of Figure 1.
Figure 3:
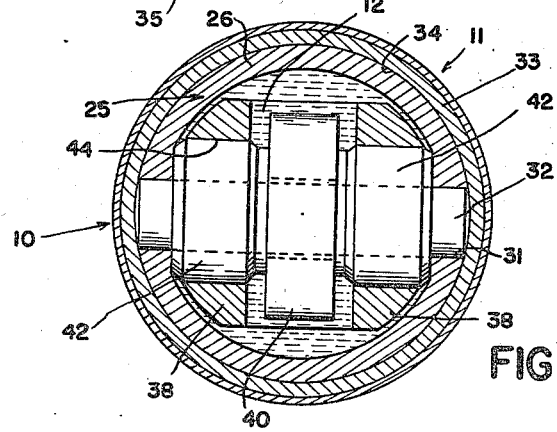
Figure 3 is a cross sectional view taken on the plane indicated by the line 3—3 of Figure 1.

Upon reference to Figure 2 of the drawing, it will be noted that the cylindrical portion 26 of the driving member is formed with aligned openings 31 in diametrically opposite sides thereof for receiving the opposite extremities of a torque transmitting pin 32. The pin 32 is retained against axial displacement by means of a ring 33 having an internal cylindrical surface 34 engaging the external surface of the cylindrical portion 26 on the driving member 25 in overlapping relation to the apertures 31 and having an outer spherical surface 35 slidably engaging a correspondingly spherical surface formed on a shell 36. The shell 36 is provided with a tubular rearwardly extending portion 37 telescopically receiving the tubular driven member 13 in a manner to provide for relative sliding movement between the shell and tubular driven member 13.

The forward end of the torque transmitting member 12 of my improved spline joint is fashioned to form laterally spaced arms 38 extending into the cylindrical portion 26 of the driving member 25 on opposite sides of the torque transmitting pin 32 and having the free ends integrally connected by means of a rib 39. The arms 38 are pivotally connected to the torque transmitting pin 32 by means of a kingpin 40 having an opening therethrough intermediate the ends thereof for receiving the pin 32 and having the opposite ends extending into apertures 25 formed in the arms 38. The opposite sides of the kingpin 40 are shown in Figure 2 as flat and the adjacent sides are formed concentric with the axis of the kingpin to provide the necessary pivotal movement of the torque transmitting member 12.

The torque is transmitted from the pin 32 to the member 12 through the medium of a pair of anti-friction rollers 42 journalled on the pin 32 at opposite sides of the kingpin 40 by means of suitable needle bearings 43. The diameter of the rollers 42 and the lateral spacing between the arms 38 are such that the periphery of the rollers engages the adjacent flat surfaces 44 of the arms. The above arrangement is such that during transmission of torque from the driving member 25 to the member 12 through the pin 32, the rollers freely roll in contact with the respective surfaces 44 of the arms 38 and, accordingly, frictional losses are reduced to the minimum. It is also important to note that the torque is transmitted from the driving member to the member 12 at points spaced a substantial distance outwardly from the center of rotation C of the universal joint so as to provide relatively long leverage arms and, due to the disposition of the rollers, the bending moment arms are relatively short. As a result, relatively large torques may be transmitted without unduly straining the elements of the joint.

Reference has been made above to the fact that the universal joint is packed with lubricant prior to permanently sealing the joint. In this connection, it will be noted that the lubricant is confined in the joint by means of a skirt 45 secured to the shell 36 in rear of the cylindrical portion 26 on the driving member 25 and terminating in close proximity to the torque transmitting member 12. As a result, the skirt functions to retain the lubricant in the joint, regardless of the centrifugal action of the lubricant during rotation of the joint.

It will be observed from the foregoing that my improved spline joint 10 and a torque transmitting universal joint may be combined to form a compact, unitary assembly. It will also be understood from the above that the shock absorbing characteristics of the spline joint 10 serve to enhance the efficiency of operation of the universal joint in that it insures cushioning shocks which would otherwise be imparted directly to the elements of the universal joint. It will, of course, be understood that my improved spline joint is not limited to use in combination with the particular universal joint previously described since it may be advantageously employed in any organization where it is desired to transmit motion and also cushion shock reactions.

What I claim as my invention is:

1. In a torque transmitting joint, a pair of telescopically engaging members slidable relative to each other in opposite directions, the inner member having a slot therethrough elongated in the direction of the axes of the members and forming with the outer member a chamber containing a fluid medium, said outer member having an end wall cooperating with the adjacent end wall of the inner member to form a second chamber also containing a fluid medium and communicating with the first chamber through a restricted port whereby relative movement of the members in opposite directions axially of the members is damped, and a pin extending transversely through said slot in the inner member and having the opposite ends connected to the outer member for transferring torque from one member to the other.

2. In a torque transmitting joint, a pair of telescopically engaging members slidable relative to each other in opposite directions, the inner member having a slot therethrough elongated in the direction of the axes of the members and forming with the outer member a chamber containing a fluid medium, said outer member having an end wall cooperating with the adjacent end wall of the inner member to form a second chamber also containing a fluid medium and communicating with the first chamber through a restricted port whereby relative movement of the members in opposite directions axially of the members is damped, a pin extending transversely through said slot in the inner member and having the opposite ends connected to the outer member, and a roller rotatably mounted on said pin and having the peripheral surface thereof engaging the opposite longitudinally extending walls of the slot to transfer a rotative force from one member to the other.

3. In a torque transmitting joint, a pair of telescopically engaging members slidable relative to each other in opposite directions, the inner member having a slot therethrough elongated in the direction of the axes of the members and forming with the outer member a chamber containing a fluid medium, said outer member having an end wall cooperating with the adjacent end wall of the inner member to form a second chamber also containing a fluid medium and communicating with the first chamber through a restricted port whereby relative movement of the members in opposite directions axially of the members is damped, a pin extending transversely through said slot in the inner member and having the opposite ends extending into openings formed in the outer member, a pair of rollers rotatably mounted on the pin in juxtaposition to each other and having the peripheral surfaces thereof engaging the opposite longitudinally extending surfaces of the slot, and a casing slidably engaging the outer member and closing said openings.

4. In a torque transmitting joint, a member having a bore, a second member extending into said bore and having a sliding fit with the inner surface of said bore, said second member having a slot therethrough intermediate the ends thereof, the slot being elongated in the direction of relative sliding movement of said members and the openings at opposite sides of the slot being closed by the adjacent surfaces of the first member, a torque transmitting pin extending transversely of the members through said slot and having the opposite ends anchored in the first member, and anti-friction means on said pin having a rolling engagement with the opposite longitudinally extending side walls of said slot.

5. In a torque transmitting joint, a member having a bore, a second member extending into said bore and having a sliding fit with the inner surface of the bore, said second member having a slot therethrough intermediate the ends thereof and elongated in the direction of relative sliding movement of said members, the openings at opposite sides of said slot being closed by the adjacent surfaces of the first member and the opposite longitudinally extending side walls of the slot being flat, a pin extending transversely of the members through said slot and having the opposite ends respectively anchored in opposite sides of the first member, and anti-friction means on said pin extending for substantially the full width of the slot and having a rolling engagement with the flat sides of said slot.

6. In a torque transmitting joint, a member having a bore therein closed at one end, a second member extending into said bore and slidably engaging the inner surface of the bore, said second member having a slot therethrough intermediate the ends thereof, the slot being elongated in the direction of relative sliding movement of said members and the openings at opposite sides of the slot being closed by the adjacent surfaces of the first member to form a chamber containing fluid, the end of the second member adjacent the closed end of the bore cooperating with the closed end of the bore to form a second chamber containing fluid medium and having a restricted communication with the first chamber through the end aforesaid of the second member whereby relative axial movement of the member in directions to diminish the volume of the second chamber is damped by the fluid in the latter chamber to a degree depending on the restriction of said communication, and a driving connection between said members including means extending transversely through said slot in engagement with the opposite longitudinal side walls of the slot and having the ends respectively anchored in the opposite sides of said first member.

7. In a torque transmitting joint, a member having a bore therein closed at one end, a second member extending into said bore and slidably engaging the inner surface of the bore, said second member having a slot therethrough intermediate the ends thereof, the slot being elongated in the direction of relative sliding movement of said members and the openings at opposite sides of the slot being closed by the adjacent surfaces of the first member to form a chamber containing fluid, the end of the second member adjacent the closed end of the bore cooperating with the latter end to form a second chamber containing a fluid medium and having a restricted communication with the first chamber through the end aforesaid of the second member whereby relative axial movement of the member in directions to diminish the volume of the second chamber is damped by the fluid in the latter chamber to a degree depending on the restriction of said communication, and a driving connection between said members including means extending transversely through said slot in engagement with the opposite longitudinal side walls of the slot and having the ends respectively anchored in the opposite sides of said first member, said torque transmitting means extending for substantially the full width of the slot between opposite side walls of the first member and acting as a piston to displace fluid from the second chamber into the first chamber upon relative movement of the members in a direction opposite the direction aforesaid.

8. In a torque transmitting joint, a member having a smooth bore therein closed at one end, a second member extending into said bore and having a cylindrical surface slidably engaging the inner surface of the bore, said second member having a slot therethrough intermediate the ends thereof, the slot being elongated in the direction of relative sliding movement of said members and the openings at opposite sides of the slot being closed by the adjacent surfaces of the first member to form a chamber containing fluid, the end of the second member adjacent the closed end of the bore cooperating with the latter end to form a second chamber containing fluid medium and having a restricted communication with the first chamber through the end aforesaid of the second member whereby relative axial movement of the members in directions to diminish the volume of the second chamber is damped by the fluid in the latter chamber to a degree depending on the restriction of said communication, a torque transmitting pin extending transversely through said slot and having the opposite ends anchored in the adjacent side walls of the first member, and anti-friction means mounted on the pin and having a rolling engagement with the opposite longitudinally extending side walls of the slot, said anti-friction means extending for substantially the full width of the slot between the opposite side walls of the first member and acting as a piston to displace fluid from the first chamber through the restricted communication to the second chamber upon relative axial movement of the members in a direction opposite the direction aforesaid.

ANTON F. GREINER.